United States Patent
Matsui et al.

(10) Patent No.: US 7,490,219 B2
(45) Date of Patent: Feb. 10, 2009

(54) COUNTER COUNTS VALID REQUESTS BASED ON A JUDGMENT IN A SYSTEM HAVING A PLURALITY OF PIPELINE PROCESSORS

(75) Inventors: Takao Matsui, Kawasaki (JP); Yuka Hosokawa, Kawasaki (JP); Makoto Hataida, Kawasaki (JP); Toshikazu Ueki, Kawasaki (JP); Seishi Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 510 days.

(21) Appl. No.: 11/157,809

(22) Filed: Jun. 22, 2005

(65) Prior Publication Data

US 2006/0212683 A1  Sep. 21, 2006

(30) Foreign Application Priority Data

Mar. 16, 2005  (JP) ............................. 2005-075091

(51) Int. Cl.
- G06F 15/00 (2006.01)
- G06F 15/76 (2006.01)
- G06F 9/30 (2006.01)
- G06F 9/40 (2006.01)

(52) U.S. Cl. ........................................ 712/28; 712/214
(58) Field of Classification Search ................. 712/214, 712/28

See application file for complete search history.

(56) References Cited

U.S. PATENT DOCUMENTS

| | | | |
|---|---|---|---|
| 4,847,755 A * | 7/1989 | Morrison et al. ............. | 712/203 |
| 5,860,018 A * | 1/1999 | Panwar ......................... | 712/23 |
| 6,006,318 A * | 12/1999 | Hansen et al. ................ | 712/28 |
| 6,249,855 B1 * | 6/2001 | Farrell et al. ................. | 712/23 |
| 6,490,674 B1 | 12/2002 | Arnold et al. | |
| 6,505,293 B1 * | 1/2003 | Jourdan et al. .............. | 712/217 |
| 6,711,670 B1 | 3/2004 | Soltis, Jr. et al. | |
| 6,938,147 B1 * | 8/2005 | Joy et al. ....................... | 712/28 |
| 7,254,695 B2 * | 8/2007 | Barry ........................... | 712/34 |
| 7,272,664 B2 * | 9/2007 | Arimilli et al. .............. | 709/250 |
| 7,337,306 B2 * | 2/2008 | Homewood et al. ......... | 712/234 |
| 2002/0032850 A1 * | 3/2002 | Kauffman .................... | 712/31 |

FOREIGN PATENT DOCUMENTS

| | | |
|---|---|---|
| JP | 64-10332 | 1/1989 |
| JP | 4-367031 | 12/1992 |
| JP | 11-306020 | 11/1999 |

OTHER PUBLICATIONS

European Search Report dated Dec. 21, 2007 for corresponding European Patent Application No. 05013582.1-1243.

* cited by examiner

*Primary Examiner*—Eddie P Chan
*Assistant Examiner*—Corey S Faherty
(74) *Attorney, Agent, or Firm*—Staas & Halsey LLP

(57) ABSTRACT

In the present invention, in order that a busy judgment of a register can be made without fail and without increasing the number of hardware resources for storing a request into the register provided at the final stage of a pipeline register in a stage in which the request is retained halfway in the pipeline register in a pipeline processor, a first counter for counting the number of valid requests in the registers between a judgment section interposed in the pipeline register and for judging whether the request is a valid request and a request queue and a busy judgment section for judging whether the request queue is in a busy state based on the number of valid requests counted by the first counter are provided and a judgment is made by the judgment section based on the result of the busy state judgment by the busy judgment section.

12 Claims, 9 Drawing Sheets

FIG. 2

| CST[3:0] | | JUDGMENT RESULT | |
|---|---|---|---|
| LOW | 0000 | (1) NO HIT | ←NO HIT TO CPU Cache NOR DIMM |
| | 0001 | (2) DIMM HIT | ←HIT TO SUBORDINATE DIMM |
| | 0010 | (3) SHARED SINGLE HIT | ←SHARED HIT TO ONE OF SUBORDINATE CPUs |
| | 0011 | (4) SHARED DOUBLE HIT | ←SHARED HIT TO BOTH OF SUBORDINATE CPUs |
| | 0100 | (5) EXCLUSIVE HIT | ←EXCLUSIVE HIT TO EITHER OF SUBORDINATE CPUs |
| HIGH | 0101 | (6) MODIFY HIT | ←MODIFY HIT TO EITHER OF SUBORDINATE CPUs |

FIG. 3

| ABTST[1:0] | | JUDGMENT RESULT |
|---|---|---|
| LOW | 00 | (a) NO ABORT ←RETRY/BUSY IS NOT DETECTED AND PROCESS CAN BE CONTINUED. |
| | 01 | (b) RETRY ← RETRY FACTOR SUCH AS ADDRESS MATCH IS DETECTED AND RETRY IS INSTRUCTED. |
| HIGH | 10 | (c) BUSY ←BUSY OF SOURCE TO BE USED IS DETECTED AND RETRY IS INSTRUCTED. |
| | 11 | RESERVED |

COUNTER COUNTS VALID REQUESTS BASED ON A JUDGMENT IN A SYSTEM HAVING A PLURALITY OF PIPELINE PROCESSORS

BACKGROUND OF INVENTION

1) Field of the Invention

The present invention relates to a technique for, in a device, for example, provided with a register for retaining a request at the final stage of a pipeline register including a number of multi-stage registers, making a Judgment about the entry (storage) into the register in a stage in which the request is retained halfway in the pipeline register.

2) Description of the Related Art

Conventionally, there is a pipeline device provided with a queue for retaining a request at the final stage of a pipeline register including a number of multi-stage registers and functioning as a shift register (for example, refer to Patent Document 1 mentioned below).

A conventional information processing system provided with such a pipeline processor is shown in FIG. 9. As shown in FIG. 9, an information processing system 100 comprises a plurality of (eight, here) pipeline processors 110-0 to 110-7 (denoted by SB (System Board) 0 to SB7 in the figure), and the plurality of pipeline processors 110-0 to 110-7 (hereinafter, denoted simply by a symbol "110" for description when it is not necessary in particular to distinguish the plurality of pipeline processors 110-0 to 110-7 from each other) execute a pipeline process in synchronization with each other at the same time, and each of the plurality of pipeline processors 110-0 to 110-7 is connected to two operation sections (denoted by CPU (Central Processing Unit) in the figure) A-0 to A-7 and B-0 to B-7 (hereinafter, denoted simply by a symbol "A and B" for description when it is not necessary in particular to distinguish the operation sections A-0 to A-7 and B-0 to B-7 from each other) via data buses (FSB: Front Side Bus) 111-0 to 110-7 (hereinafter, denoted simply by a symbol "111" for description when it is not necessary in particular to distinguish the data buses 111-0 to 111-7 from each other).

Note that, each of the plurality of pipeline processors 110-0 to 110-7 is connected to the corresponding one of the data buses 111-0 to 111-7 having the same last number of the symbol as that of the pipeline processor and further, each of the plurality of pipeline processors 110-0 to 110-7 is connected to corresponding two of the operation sections A-0 to A-7 and B-0 to B-7 having the same last number of the symbol as that of the pipeline processor via the data bus 111.

For example, the pipeline processor 110-0 is connected to the operation sections A-0 and B-0 via the data bus 111-0, the pipeline processor 110-1 is connected to the operation sections A-1 and B-1 via the data bus 111-1, and the pipeline processor 110-7 is connected to the operation sections A-7 and B-7 via the data bus 111-7.

In FIG. 9, for simplification of the figure, the pipeline processors 110-2, 110-3, 110-4, 110-5, and 110-6, and the data buses 111-2, 111-3, 111-4, 111-5, and 111-6, and the operation sections A-2, B-2, A-3, B-3, A-4, B-4, A-5, B-5, A-6, and B-6 are not shown.

The information processing system 100 comprises a controller (denoted by XB (Crossbar Board) in the figure) 120 for notifying the plurality of pipeline processors 110 of a request and making one of the plurality of pipeline processors 110 deal with the request.

In the information processing system 100, a selection section 121 of a controller 120 selects a request out of requests REQ0 to REQn with respect to the controller 120, taking into account each priority of the requests REQ0 to REQn, and simultaneously notifies the corresponding pipeline processors 110-0 to 110-7 of the selected request using GSA (Global System Address)-SB0 to GSA-SB7.

Then, each pipeline processor 110 retains the notified request by means of a pipeline register 112 including a number of registers 112a. At this time, each pipeline processor 110 retains the request while sequentially moving the request from the upstream side to the downstream side of the plurality of registers 112a with the same timing as that of the other pipeline processors 110 based on the system clock (synchronization signal) in the information processing system 100.

On the other hand, an LCST (Local Cache Status) generation logic 114 of each pipeline processor 110 retrieves a storage section (denoted by TAG in the figure) with the same timing as that of the other pipeline processors 110 and judges whether or not the data to be used by the request is retained in the storage section of the subordinate operation sections A and B.

Further, the LCST generation logic 114 judges whether or not a request queue (denoted by SLVQ_FSB (Slave Request Queue) in the figure) 117, which will be described later, can store the request (that is, whether or not the request queue 117 is in a busy state)

Then, a condition generation section (denoted by "condition generation" in the figure) 115 of the LCST generation logic 114 determines an operation as to whether or not the request is a valid request that can be dealt with based on the judgment result as to whether or not the cache is hit by the LCST generation logic 114 and the judgment result as to whether or not the request queue 117 is in a busy state.

Next, the LCST generation logic 114 further transmits the TAG information of itself (that is, information as to whether or not the cache is hit as a result of the above-mentioned retrieval by the storage section 113) and the operation determining information as to whether or not the request is a valid request that can be dealt with, to the controller 120 using LCST-SB0 to LCST-SB7.

Then, an LCST summarizing logic 122 of the controller 120 summarizes the information transmitted from the plurality of pipeline processors 110, and a GCST (Global Cache Status) generation logic 123 makes a total judgment about the information transmitted from each pipeline processor 110, determines the operation as the information processing system 100 for making one of the plurality of pipeline processors 110 deal with the request, and notifies the corresponding pipeline processor 110 of the determined operation using GCST-SB0 to GCST-SB7.

Moreover, the controller 120 also comprises a pipeline register 124 including a number of registers 124a and the pipeline register 124 retains the request while sequentially moving the request from the upstream side to the downstream side based on the system clock in order to synchronize with each pipeline processor 110 during the period of time from the notification of the request to each pipeline processor 110 until the transmission of the operation determining information about the request from each pipeline processor 110.

Then, a GCST judgment logic 116 of each pipeline processor 110 receives a determined operation notified from the controller 120 using corresponding GCST-SB0 to GCST-SB7 and judges whether or not the request is stored in the request queue 117 provided at the subsequent stage of the pipeline register 112 based on the received determined operation.

In other words, the pipeline processor 110 among the plurality of pipeline processors 110, which obtains an operation permission (that is, the pipeline processor 110 that is determined to deal with the request), stores the request in the request queue 117.

Here, the request queue 117 is a register for retaining a request by the FIFO (First In First Out) method, and the request is retained in the request queue 117 and thereby is delivered to the operation sections A and B via the data bus 111 and executed.

The pipeline register 112 of each pipeline processor 110 retains the request while sequentially moving the request from the upstream side to the downstream side based on the system clock in order to absorb the time lag between the receipt of the request from the controller 120 until the decision of the operation of itself (that is, during the period of time of the retrieval of the TAG information retained in the storage 113).

Further, the pipeline register 112 of each pipeline processor 110 retains the request while sequentially moving the request from the upstream side to the downstream side based on the system clock in order to synchronize with the controller 120 during the period of time from the transmission of the operation determining information of itself etc. by the LCST generation logic 114 to the controller 120 until the reception of the determined operation by the GCST judgment logic 116 from the GCST generation logic 123.

As described above, in the information processing system 100, it is necessary for the LCST generation logic 114 (condition generation section 115) to make a judgment about the entry (storage) of the request into the request queue in a stage in which the request is retained halfway in the pipeline register 112 in each pipeline processor 110.

In other words, it is necessary for each pipeline processor 110 to determine an operation as to whether or not the request is a valid request that can be dealt with by itself (that is, whether or not the request can be executed by its subordinate operation sections A and B) in a stage in which the request is retained halfway in the pipeline register 112.

Moreover, since the final determination of the operation as to whether or not the request is actually dealt with is performed by the GCST generation logic 123 of the controller 120 and is made clear in each pipeline processor when the request passes through the final stage of the pipeline register 112, it is necessary for the LCST generation logic 114 of each pipeline processor 110 to make a judgment as to whether or not the request queue 117 is in a busy state while taking into account the other requests retained in the register 112a interposed between the condition generation section 115 and the request queue 117.

In other words, it is necessary for the LCST generation logic 114 to make a judgment in advance as to whether or not the request queue 117 is in a busy state when storing the request into the request queue 117, and thereby avoiding such a situation in which the request queue 117 is in a busy state when the request is actually stored into the request queue 117.

Here, by referring to FIG. 10, a concrete busy state judgment method of the request queue 117 by the LCST generation logic 114 is explained below.

As shown in FIG. 10, when the request queue 117 has m stages (m is an integer not less than 1: that is, m requests can be put into entry), there are n stages of the register 112a in the pipeline register 112 between the condition generation section 115 and the request queue 117 (n is an integer not less than 1), and x stages of the request queue 117 (x is an integer; x<m) are occupied by valid requests (that is, there exist x valid entries), the LCST generation logic 114 makes a judgment about the busy state of the request queue 117 under the condition shown by the following expression (X) on the assumption that all of the n stages of the register 112a have the valid request.

$$x+n=m \quad (X)$$

In other words, if the sum of x, which is the number of valid entries in the request queue 117 and n, which is the number of stages of the register 112a between the condition generation section 115 and the request queue 117 is equal to m, which the total number of entries in the request queue 117, the LCST generation logic 114 makes a judgment that the request queue 117 is in a busy state.

In addition, conventionally, a technique for counting the number of valid entries (x stages in FIG. 10) in a queue (register) for retaining a request has been proposed (for example, refer to Patent Documents 1 and 2 mentioned below).

However, the busy judgment method by the LCST generation logic 114 described above by referring to FIG. 10 may sometimes judge a queue to be in a busy state even when it is not in a busy state actually, because invalid entries present in the n stages of the register 112a are dealt as valid entries, and it is not possible to effectively utilize the number of entries in the request queue 117.

Further, the busy judgment method described above cannot be applied to a case where n, which is the number of stages of the register 112a between the condition generation section 115 and the request queue 117, is equal to or greater than m, which is the total number of entries in the request queue, because the LCST generation logic 114 always detects a busy state.

Therefore, a method is conceivable in which a judgment is made as to whether or not all the n stages of the register 112a retain the valid entry each time when the condition generation section 115 determines an operation, but this method requires a circuit etc. for making a judgment as to whether each register 112a retains a valid or an invalid request, therefore, the hardware resources will be increased and the manufacturing cost will be increased.

[Patent Document 1]
  Japanese Patent Laid-open No. HEI 4-367031

[Patent document 2]
  Japanese Patent Laid-open No. SHOWA 64-10332

SUMMARY OF THE INVENTION

The present invention has been made in view of such problems, and an object thereof is to make it possible to make a busy judgment of a register, without fail and without increasing hardware resources, for storing a request into the register provided at the final stage of a pipeline register, in a stage in which the request is retained halfway in the pipeline register, in a pipeline processor of the information processing system as described above.

In order to attain the above-mentioned object, the information processing system of the present invention is an information processing system, including: a plurality of pipeline processors, connected to an operation section for executing a request, for executing a pipeline process in synchronization with each other; and a controller for notifying the plurality of pipeline processors of a request at the same time, and determining a final operation for the request, wherein: each of the plurality of pipeline processors comprises: a pipeline register, including a number of multi-stage registers capable of retaining a request notified by the controller, for retaining the request while sequentially moving the request from the upstream side to the downstream side; a request queue, provided at the subsequent stage of the pipeline register, for storing the request; a judgment section for judging whether or not the request stored in the request queue is a valid request capable of being retained by the request queue; a first counter for counting the number of the valid requests in the registers between the judgment section and the request queue; a busy judgment section for judging whether or not the request queue is in a busy state based on the number of the valid requests counted by the first counter; and a judgment result notification section for notifying the controller of the result of the busy state judgment by the busy judgment section, the judgment section makes the judgment based on the result of the busy state judgment by the busy judgment section; and the controller comprises: a request notification section for simultaneously notifying the plurality of pipeline processors of a request; a determination section for determining a final operation for the request based on the result of the busy state judgment notified from the judgment result notification section of the plurality of pipeline processors; and a determination result notification section for simultaneously notifying the plurality of pipeline processors of the determination result by the determination section.

Moreover, it is preferable that if the request queue is judged to be in a busy state by the busy judgment section, the judgment section does not judge that the request is the valid request.

It is also preferable that each of the plurality of pipeline processors comprise: a second counter for counting the number of valid entries of the request queue; and a calculation section for calculating the sum of the number of the valid requests counted by the first counter and the number of the valid entries counted by the second counter, and that the busy judgment section compare the sum calculated by the calculation section with the total number of entries of the request queue and judge that the request queue is in a busy state if the sum is equal to the total number of the entries.

Further, it is preferable that the second counter, if the valid request is newly put into the request queue as the valid entry, increment the number of the valid entries by one and on the other hand, if the request process relating to the valid entry retained in the request queue is completed, decrement the number of the valid entries by one, and that the first counter, if the judgment section judges that the request is the valid request, increment the number of the valid requests by one and on the other hand, if the valid request passes through the final stage register of the pipeline register, decrement the number of the valid requests by one.

Moreover, it is preferable that each of the plurality of pipeline processors comprise a determination section for putting the request into the request queue as the valid entry if the determination result notified from the determination result notification section of the controller is that the request is to be dealt with by itself and on the other hand, for invalidating the request if the determination result is that the request is not to be dealt with by itself.

It is also preferable that each of the plurality of pipeline processors comprise: a data information retainment section for retaining the data information concerning the data retained in the storage section of the operation section connected to itself; and a retainment judgment section for judging whether or not the operation section connected to itself retains the data to be used by the request notified from the controller based on the data information retained in the data information retainment section, that the judgment result notification section notify the controller of the result of the retainment judgment by the retainment judgment section, and that the judgment section make the judgment based on the result of the retainment judgment by the retainment judgment section.

At this time, it is preferable that the determination section of the controller determines a final operation for the request based on the result of the retainment judgment by the retainment judgment section notified from the judgment result notification section of the plurality of pipeline processors.

Further, it is preferable that the retainment judgment section make a judgment as to whether or not the data used by the request is the most recent data based on the data information, and that the judgment result notification section, if the retainment judgment section judges that the data used by the request is the most recent data, notify the controller of information about the retainment of the most recent data used by the request as the result of the retainment judgment by the retainment judgment section.

Moreover, in order to attain the above-mentioned object, the pipeline processor of the present invention is a pipeline processor, connected to an operation section for executing a request and to a controller for determining a final operation for a request as well as notifying the request, for executing a pipeline process in synchronization with other pipeline processors, the pipeline processor comprising: a pipeline register, including a number of multi-stage registers capable of retaining a request notified by the controller, for retaining the request while sequentially moving the request from the upstream side to the downstream side; a request queue, provided at the subsequent stage of the pipeline register, for storing the request; a judgment section for judging whether or not the request stored in the request queue is a valid request capable of being retained by the request queue; a first counter for counting the number of the valid requests in the registers between the judgment section and the request queue; a busy judgment section for judging whether or not the request queue is in a busy state based on the number of the valid requests counted by the first counter; and a judgment result notification section for notifying the controller of the result of the busy state judgment by the busy judgment section, wherein the judgment section makes the judgment based on the result of the busy state judgment by the busy judgment section.

Moreover, it is preferable that if the request queue is judged to be in a busy state by the busy judgment section, the judgment section does not judge that the request is the valid request.

It is preferable to comprise: a second counter for counting the number of valid entries of the request queue; and a calculation section for calculating the sum of the number of valid requests counted by the first counter and the number of valid entries counted by the second counter, and that the busy judgment section compare the sum calculated by the calculation section with the total number of entries of the request queue and judge that the request queue is in a busy state if the sum is equal to the total number of the entries.

It is also preferable that the second counter, if the valid request is newly put into the request queue as the valid entry, increment the number of valid entries by one and on the other hand, if the request process relating to the valid entry retained in the request queue is completed, decrement the number of valid entries by one, and that the first counter, if the judgment section judges that the request is the valid request, increment the number of valid requests by one and on the other hand, if the valid request passes through the final stage register of the pipeline register, decrement the number of valid requests by one.

Moreover, it is preferable to comprise a determination section for putting the request into the request queue as the valid entry if the final determination result for the request notified from the controller is that the request is to be dealt with by itself and on the other hand, for invalidating the request if the request is not to be dealt with by itself.

Further, it is preferable to comprise: a data information retainment section for retaining the data information concerning the data retained in the storage section of the operation section connected to itself; and a retainment judgment section for judging whether or not the operation section connected to itself retains the data to be used by the request notified from the controller based on the data information retained in the data information retainment section, and that the judgment result notification section notify the controller of the result of the retainment judgment by the retainment judgment section and at the same time, the judgment section make the judgment based on the result of the retainment judgment by the retainment judgment section. At this time, it is also preferable that the retainment judgment section make a judgment as to whether or not the data used by the request is the most recent data based on the data information, and that the judgment result notification section, if the retainment judgment section judges that the data used by the request is the most recent data, notify the controller of information about the retainment of the most recent data used by the request as the result of the retainment judgment by the retainment judgment section.

Moreover, in order to attain the above-mentioned object, the busy judgment program of the present invention is a busy judgment program for making a computer realize a function of judging a busy state of a request queue for a request in a stage in which the request is retained halfway in a pipeline register in each of plurality of pipeline processors, connected to an operation section for executing a request and to a controller for determining a final operation for a request as well as notifying the request, comprising a pipeline register, including a number of multi-stage registers capable of retaining a request notified by the controller, for retaining the request while sequentially moving the request from the upstream side to the downstream side, and the request queue, provided at the subsequent stage of the pipeline register, for executing a pipeline process in synchronization with each other, and the program instructs a computer to function as: a judgment section for judging whether or not the request stored in the request queue is a valid request capable of being retained by the request queue in a stage in which the request is retained halfway in the pipeline register; a first counter for counting the number of valid requests in the registers between the judgment section and the request queue; and a busy judgment section for judging whether or not the request queue is in a busy state based on the number of the valid requests counted by the first counter and at the same time, the busy judgment program makes the computer function so that the judgment section makes the judgment based on the result of the busy state judgment by the busy judgment section.

It is preferable that the busy judgment program instruct a computer to function as: a second counter for counting the number of valid entries of the request queue; and a calculation section for calculating the sum of the number of valid requests counted by the first counter and the number of the valid entries counted by the second counter and at the same time, making the computer function so that the busy judgment section compares the sum calculated by the calculation section with the total number of entries of the request queue and judges that the request queue is in a busy state if the sum is equal to the total number of the entries.

In order to attain the above-mentioned object, the computer readable recording medium of the present invention is one in which the above-mentioned busy judgment program is stored.

According to the present invention, since each pipeline processor is provided with the first counter for counting the number of valid requests retained in the registers between the judgment section and the request queue, it is possible for the busy judgment section to make a busy judgment of the request queue without fail, which is used to judge whether or not a request is a valid request in the stage in which the request is retained halfway in the pipeline register.

Further, since the first counter counts the number of valid request retained in the plurality of registers between the judgment section and the request queue, it is not necessary to provide a circuit etc. for judging whether a valid request or an invalid request is retained for each of the plurality of registers and the hardware resources will not be increased.

BRIEF DESCRIPTION OF THE DRAWINGS

FIG. 2 is a diagram for explaining judgment results by a retainment judgment section of a pipeline processor in the information processing system of the present embodiment;

FIG. 3 is a diagram for explaining judgment results by a busy judgment section of a pipeline processor in the information processing system of the present embodiment;

DESCRIPTION OF THE PREFERRED
EMBODIMENTS

Embodiments of the present invention are explained below by referring to drawings.

[1] About an Embodiment of the Present Invention

First, by referring to a block diagram shown in FIG. 1, the configuration of an information processing system 1 in an embodiment of the present invention is explained below.

Figure 1:
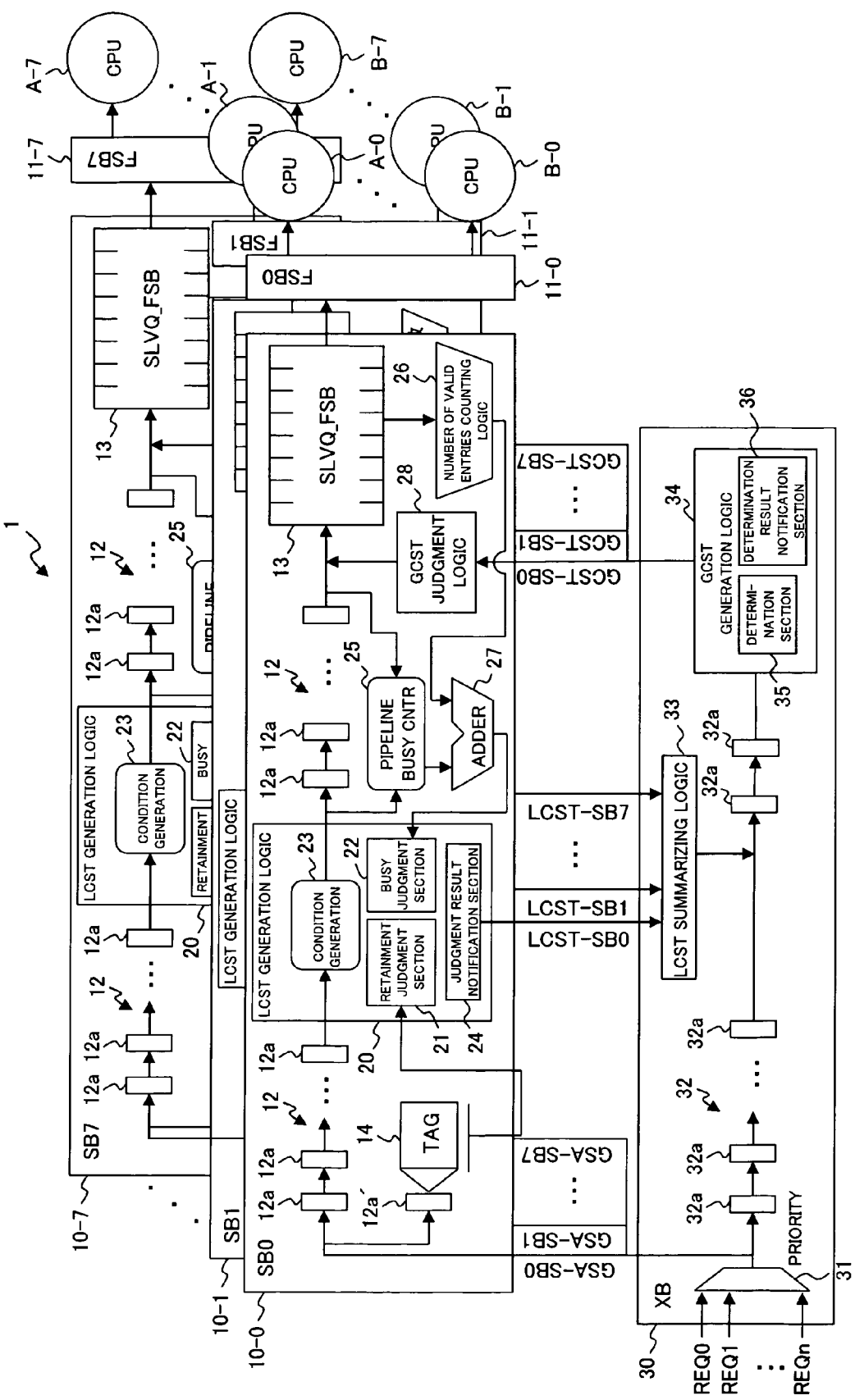
FIG. 1 is a block diagram showing a configuration of an information processing system according to one preferred embodiment of the present invention.

As shown in FIG. 1, the information processing system 1 comprises a plurality (eight, here) of pipeline processors (denoted by SB (System Board) in the figure) 10-0 to 10-7, data buses (FSB: Front Side Bus) 11-0 to 11-7, operation sections (denoted by CPU (Central Processing Unit) in the figure) A-0 to A-7 and B-0 to B-7, and a controller (denoted by XB (Crossbar Board) in the figure) 30.

Each of the plurality of pipeline processors 10-0 to 10-7 (hereinafter, denoted simply by a symbol "10" for description when it is not necessary to distinguish the plurality of pipeline processors 10-0 to 10-7 from each other) is connected to the two operation sections A-0 to A-7 and B-0 to B-7 (hereinafter, denoted simply by a symbol "A and B" for description when it is not necessary to distinguish the operation sections A-0 to A-7 and B-0 to B-7 from each other) via the data buses 11-0 to 11-7 (hereinafter, denoted simply by a symbol "11" for description when it is not necessary to distinguish the data buses 11-0 to 11-7 from each other).

Not that each of the plurality of pipeline processors 10-0 to 10-7 is mutually connected with the data buses 11-0 to 11-7 and each of the plurality of pipeline processors 10-0 to 10-7 is connected to the corresponding two of the operation sections A-0 to A-7 and B-0 to B-7 having the same last number of the symbol as that of the pipeline processors 10 via the data buses 11.

For example, the pipeline processor 10-0 is connected to the operation sections A-0 and B-0 via the data bus 11-0, the pipeline processor 10-1 is connected to the operation sections A-1 and B-1 via the data bus 11-1, and the pipeline processor 10-7 is connected to the operation sections A-7 and B-7 via the data bus 11-7.

Moreover, in FIG. 1, the pipeline processors 10-2, 10-3, 10-4, 10-5, and 10-6, the buses 11-2, 11-3, 11-4, 11-5, and 11-6, and the operation sections A-2, B-2, A-3, B-3, A-4, B-4, A-5, B-5, A-6, and B-6 are not shown for simplification of the figure.

Each of the plurality of pipeline processors 10 is configured so as to execute a pipeline process, which will be described later, in synchronization with each other and the controller 30 notifies the plurality of pipeline processors 10 of a request and at the same time, determines a final operation for the request.

Each of the plurality of pipeline processors 10 comprises a pipeline register 12, a request queue (denoted by SLVQ_FSB in the figure; Slave Request Queue) 13, a data information retainment section (denoted by TAG in the figure) 14, an LCST (Local Cache Status) generation logic 20, a pipeline busy counter (first counter; denoted by PIPELINE BUSY CNTR in the figure) 25, a number of valid entries counting logic (second counter) 26, an adder (calculation section) 27, and a GCST (Global Cache Status) judgment logic (determination section ) 28.

The pipeline register 12 retains a request notified from the controller 30 and includes a number of multi-stage registers 12a.

The pipeline register 12 retains a request while moving it from the upstream side to the downstream side of the number of multi-stage registers 12a based on the system clock (synchronization signal; pulse signal) in the information processing system 1. In other words, the pipeline register 12 functions as a shift register.

As a result, each of the plurality of pipeline processors 10 moves a request to the register 12a on the downstream side in synchronization with each other based on the system clock in the pipeline register 12.

Each pipeline processor 10 is also configured so as to execute other processes (processes, which will be described later, in the LCST generation logic 20, the pipeline busy counter 25, the adder 27, and the GCST judgment logic 28) in synchronization with each other based on the system clock.

The request queue 13 is a register that retains a request using the first in first out (FIFO) method and is provided at the subsequent stage of the pipeline register 12.

In addition, a request retained in the request queue 13 as a valid entry is delivered to the operation sections A and B via the FSB 11 in response to the request from the operation sections A and B connected to itself and is executed in the operation sections A and B.

The data information retainment section 14 retains the data information about the data retained in a storage section (for example, a cache memory or DIMM; Dual In-line Memory Module) of the operation sections A and B connected to itself. Note that the data information retained by the data information retainment section 14 is the tag (TAG) information retained in the storage section of the operation sections A and B, but the data information retained by the data information retainment section 14 in the present invention is not limited but the data information may be one that indicates the contents of the data retained in the storage section of the operation sections A and B as long as at least it is possible for a retainment judgment section 21, which will be described later, to judge whether or not the operation sections A and B retain the data to be used by the request retained in the pipeline register 12 based on the data information.

The LCST generation logic 20 is interposed in the pipeline register 12 and judges an operation for a request retained by the pipeline register 12 and at the same time, notifies the controller 30 of the judgment result, comprising the retainment judgment section 21, a busy judgment section (busy judgment circuit) 22, a condition generation section (determination section; referred to as condition generation in the figure) 23, and a judgment result notification section 24.

The retainment judgment section 21 judges whether or not the operation sections A and B connected to itself retain the data to be used by the request notified from the controller 30 (that is, the request retained in the pipeline register 12) based on the data information retained in the data information retainment section 14.

Specifically, the retainment judgment section 21 judges the following states (1) to (6) shown in FIG. 2.

(1) The data to be used by the request is not retained in any cache memory (denoted by Cache in the figure) in the subordinate operation sections A and B connected to itself nor in the DIMM [No Hit].

(2) Data is hit in the DIMM in the subordinate operation sections A and B connected to itself [DIMM Hit].

(3) Data is hit in a shared type in one of the subordinate operation sections A and B connected to itself [Shared Single Hit].

(4) Data is hit in a shared type in both of the subordinate operation sections A and B connected to itself [Shared Double Hit].

(5) Data is hit in an exclusive type in either of the subordinate operation sections A and B connected to itself [Exclusive Hit].

(6) Data is hit in a modify type in either of the subordinate operation sections A and B connected to itself [Modify].

As described above, the retainment judgment section 21 judges the retainment state of the data used by the request based on the data information retained in the data information retainment section 14 and as shown in (6) described above, the retainment section judges whether or not the data is most recent. In other words, the retainment judgment section 21 judges whether or not the data used by the request retained in the storage section of the operation sections A and B connected to itself is the most recent data.

In addition, the pipeline processor 10 comprises the register 12a for retaining a request in order to perform retrieval of the data information retainment section 14 by the retainment judgment section 21. Therefore, when a request is notified from a request notification section 31, which will be described later, of the controller 30, the pipeline processor 10 retains the request in the pipeline register 12 and the register 12a.

The busy judgment section 22 judges whether or not the request queue 13 is in a busy state based on the number of valid requests counted by the pipeline busy counter 25 in the registers 12a between the LCST generation logic 20 and the request queue 13.

Specifically, the busy judgment section 22 judges the following states (a) to (c) as shown in FIG. 3.

(a) There is no retry factor such as address match and the request queue 13 is not in a busy state [No Abort].

(b) A retry factor such as address match is detected [Retry].

(c) A busy state of the request queue 13 is detected [Busy].

In addition, the method for judging whether or not it is in a busy state by the busy judgment section 22 will be described later by referring to FIG. 4.

The condition generation section 23 is interposed halfway in the pipeline register 12 (that is, interposed between the plurality of registers 12a) and judges whether or not the request notified from the controller 30 is a valid request (QUEUE acquisition decided request) that can be retained in the request queue.

In other words, the condition generation section 23 judges an operation for the request as to whether or not the request is a valid request that can be dealt with by itself (that is, whether or not the request can be executed by its own subordinate operation sections A and B) in the stage in which the request is retained halfway in the pipeline register 12, and judges whether or not the pipeline busy counter 25, which will be described later, is incremented by "1".

Here, the condition generation section 23 is configured so as to make the above-mentioned judgment based on the judgment result by the retainment judgment section 21 and the result of the busy state judgment by the busy judgment section 22. Specifically, in the case of the following (x) to (z), the condition generation section 23 judges that the request is not a valid request (that is, an invalid request) and on the other hand, judges that the request is a valid request in the cases other than the following (x) to (z), in order to increment the pipeline busy counter 25, which will be described later.

(x) When the judgment by the retainment judgment section 21 is that the operation sections A and B connected to itself do not retain the data to be used by the request [when (1) described above is the result of the judgment].

(y) When the judgment by the busy judgment section 22 is that the request queue 13 is in a busy state [when (c) described above is the result of the judgment].

(z) When a retry factor such as address match is detected [when (b) described above is the result of the judgment].

The judgment result notification section 24 notifies an LCST summarizing logic 33, which will be described later, of the controller 30, of the judgment result by the retainment judgment section 21 and the busy judgment section 22 using LCST (Local Cache Status; denoted by LCST-SB0 to LCST-SB7 in the figure).

Specifically, the judgment result notification section 24 notifies the controller 30 of the judgment result by the retainment judgment section 21 shown in FIG. 2 and the judgment result by the busy judgment section 22 shown in FIG. 3.

In other words, as shown in FIG. 2, the judgment result notification section 24 notifies the LCST summarizing logic 33 of the judgment result by the retainment judgment section 21 using a four-bit cache status (abbreviated to CST in FIG. 2), that is, "0000" in the case of (1) "No Hit", "0001" in the case of (2) "DIMM Hit", "0010" in the case of (3) "Shared Single Hit", "0011" in the case of (4) "Shared Double Hit", "0100" in the case of (5) "Exclusive Hit", and "0101" in the case of (6) "Modify Hit".

As described above, the judgment result notification section 24 is configured so as to notify the controller 30 of the judgment result by the retainment judgment section 21 with distinction by contents, notifying the controller 30 of the information (here, CST "0101") indicating that the most recent data to be used by the request is retained as the judgment result by the retainment judgment section 21 when the retainment judgment section 21 judges that the most recent data to be used by the request is retained.

As shown in FIG. 2, the priority of the judgment results (1) to (6) by the retainment judgment section 21 becomes higher toward the judgment result (6) from the judgment result (1) (that is, the greater the status value, the higher the priority is). Therefore, when the plural judgment results (1) to (6) are obtained by the retainment judgment section 21, the judgment result notification section 24 notifies the LCST summarizing logic 33 of only the judgment result with the highest priority based on the priority order.

The judgment result notification section 24 notifies the LCST summarizing logic 33 of the judgment result by the busy judgment section 23 using a two-bit abort status (abbreviated to ABTST in FIG. 3), that is, "00" in the case of (a) "No Abort", "01" in the case of (b) "Retry", and "10" in the case of (c) "Busy".

As described above, the pipeline busy counter 25 counts the number of valid requests in the registers 12a between the LCST generation logic 20 and the request queue 13.

Figure 4:
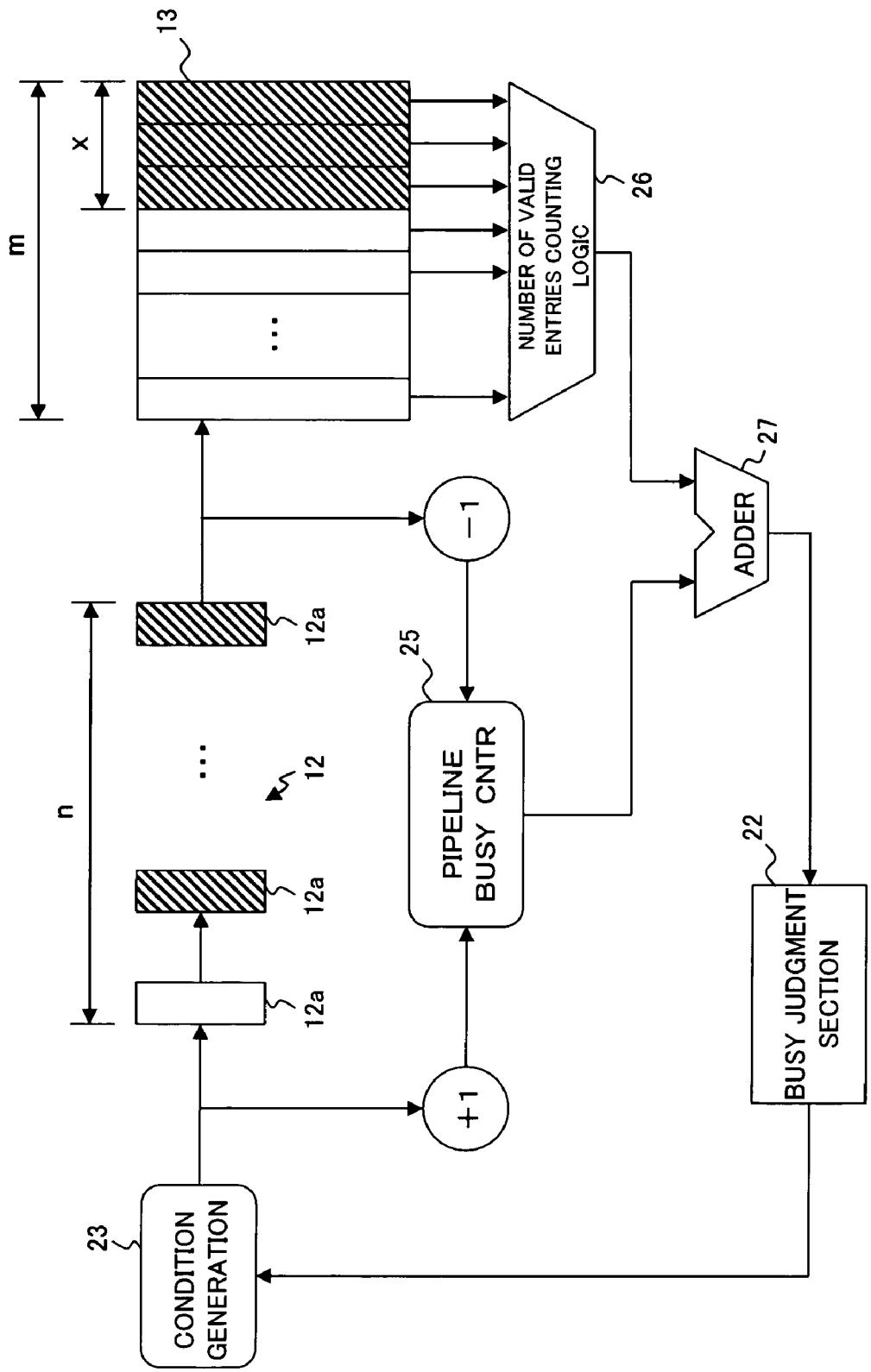
FIG. 4 is a diagram for explaining a busy judgment section and a pipeline busy counter in the information processing system of the present embodiment.

In other words, as shown in FIG. 4, when the condition generation section 23 judges that the request is a valid request and the request is moved from the condition generation section 23 to the subsequent stage resister 12a of the condition generation section 23, the pipeline busy counter 25 increments the number of valid requests (counted number) by one.

On the other hand, when a valid request passes through the final stage register 12a of the pipeline register 12, the pipeline busy counter 25 decrements the number of valid requests (counted number) by one.

Note that, in FIG. 4, the registers 12a shown by the slashes retain a valid request.

The number of valid entries counting logic 26 counts the number of entries (valid entries) where a valid request exists and increments the number of valid entries (counted number) by one when a valid request is set in the request queue 13, that is, when a valid request is newly put into the request queue 13 as a valid entry.

On the other hand, when the request process relating to the valid entry retained in the request queue 13 is completed and the valid entry becomes vacant, the number of valid entries counting logic 26 decrements the number of valid entries by one.

The adder 27 calculates the sum of the number of valid requests and the number of valid entries by adding up the number of valid requests counted by the pipeline busy counter 25 and the number of valid entries counted by the number of valid entries counting logic.

Here, the busy judgment method of the request queue 13 by the busy judgment section 22 is described as follows. The busy judgment section 22 compares the sum of the number of valid requests and the number of valid entries calculated by the adder 27 with the total number of entries of the request queue 13 and judges that the request queue 13 is in a busy state if the sum is equal to the total number of entries of the request queue 13.

In other words, as shown in FIG. 4, if it is assumed that the total number of entries of the request queue 13 is m (m is an integer not less than 1)., the number of valid entries in the request queue 13 (that is, the number of valid entries counted by the number of valid entries counting logic 26) is x (x is an integer; x<m), and the number of valid requests retained in the n-stage (n is an integer not less than 1) registers 12a interposed between the condition generation section 23 (the LCST generation logic 20) and the request queue 13 (that is, the number of valid requests counted by the pipeline busy counter 25) is y (y is an integer), the busy judgment section 22 makes a busy judgment as to the request queue 13 based on the following expression (1).

$$x+y=m \qquad (1)$$

When the sum of the number of valid requests (y) and the number of valid entries (x) is less than the total number of entries of the request queue 13 (m) the busy judgment section 22 judges that the request queue 13 is not in a busy state.

As shown in FIG. 1, the GCST judgment logic 28 puts a request into the request queue 13 as a valid entry if a determination result that the request is to be dealt with by itself is notified from the controller (specifically, the GCST generation logic 33, which will be described later) and on the other hand, invalidates the request without putting the request into the request queue 13 as a valid entry if a determination result that the request is not to be dealt with by itself or the reentry (retry) of the request is notified from the controller 30.

Here, the function of the pipeline register 12 of each pipeline processor 10 is explained by referring to FIG. 1. As described above, the pipeline register 12 of each pipeline processor 10 retains a request while moving it to the register 12a on the downstream side in synchronization with each other and with the same timing based on the system clock of the information processing system 1.

Then, the registers 12a between the uppermost-stream and the LCST generation logic 20 in the pipeline 12 of each pipeline processor 10 absorb the process (judgment) time by the retainment judgment section 21 and the busy judgment section 22 in each pipeline processor 10 in order to synchronize the processes by the condition generation section 23 and the judgment result notification section 24 with other pipeline processors 10.

In other words, the registers 12a are provided between the upper-most stream of the pipeline register 12 and the LCST generation logic 20, the number of which being such one through which a request is moved during the same period of time as the process time by the retainment judgment section 21 and the busy judgment section 22 in each pipeline processor 10.

The purpose of the registers 12a between the LCST generation logic 20 and the request queue 13 is to absorb the process time executed by the controller 30 (the process time by the LCST summarizing logic 33 and a GCST generation logic 34, which will be described later) and the process time by the GCST judgment logic 28 after a judgment result by the judgment result notification section 24 is notified.

In other words, the registers 12a are provided between the LCST generation logic 20 and the request queue 13, the number of which being such one through which a request is moved during the same period of time as the total time of the process time by the controller 30 and the process time by the GCST judgment logic 28.

Next, the controller 30 of the information processing system 1 is explained by referring to FIG. 1. The controller 30 comprises the request notification section 31, a pipeline register 32, the LCST summarizing logic 33, and the GCST generation logic 34.

The request notification section 31 selects one request from among requests REQ0 to REQn issued from the outside or the operation sections A and B connected to each pipeline processor 10 by judging the priority of each of the requests REQ0 to REQn and simultaneously notifies each pipeline processor 10 of the selected request using GSA (Global System Address; denoted by GSA-SB0 to GSA-SB7).

The pipeline register 32 retains a request notified to each pipeline processor 10 by the request notification section 31 and similar to the pipeline register 12 of the pipeline processor 10, includes a number of multi-stage registers 32a and retains the request while sequentially moving the request from the upstream side to the downstream side based on the system clock in the information processing system 1.

The registers 32a between the request notification section 31 and the LCST summarizing logic 33 in the pipeline register 32 absorb the time from the receipt of the request to the notification of the judgment result by the judgment result notification section 24 in each pipeline processor 10 in order to synchronize with each pipeline processor 10.

In other words, the registers 32a are provided between the request notification section 31 and the LCST summarizing logic 33, the number of which being such one through which a request is moved during the same period of time as the process time from the receipt of the request to the notification of the judgment result by the judgment result notification section 24 in each pipeline processor 10.

The LCST summarizing logic 33 is interposed in the pipeline register 32 and summarizes the judgment result ("CST" shown in FIG. 2) by the retainment judgment section 21 and the judgment result ("ABTST" shown in FIG. 3) by the busy judgment section 22 notified from the judgment result notification section 24 in each pipeline processor 10 using LCST-SB0 to LCST-SB7.

The GCST generation logic 34 is provided at the subsequent stage of the pipeline register 32 and assigns a request to one of the plurality of pipeline processors 10 based on the judgment result by the retainment judgment section 21 and the busy judgment section 22 in each pipeline processor 10 summarized by the LCST summarizing logic 33, and comprises a determination section 35 and a determination result notification section 36.

The determination section 35 determines a final operation of the information processing system 1 for a request and determines whether or not the request is executed based on the judgment result summarized by the LCST summarizing logic 33 and when the request is executed, determines one of the plurality of pipeline processors 10 which deals with the request.

The determination result notification section 36 simultaneously notifies the GCST judgment logic 28 of each pipeline processor 10 of the final operation (determination result) for the request determined by the determination section 35 using GCST (Global Cache Status; denoted by GCST-SB0 to GCST-SB7 in the figure).

Here, the method for determining a final operation for a request by the determination section 35 is explained by referring to examples shown in FIG. 5 to FIG. 8. In FIG. 5 to FIG. 8, for simplification of explanation and drawings, the pipeline processors 10-3 to 10-7 are not shown and further, only the LCST summarizing logic 33 is shown in the controller 30 and only the data information retainment section 14 and the LCST generation logic 20 are shown in the pipeline processors 10-0 to 10-2. The examples shown in FIG. 5 to FIG. 8 show cases where a request to read memory (hereinafter, referred to as a read request) is issued (notified) from the controller 30 to each pipeline processor 10.

Figure 5:
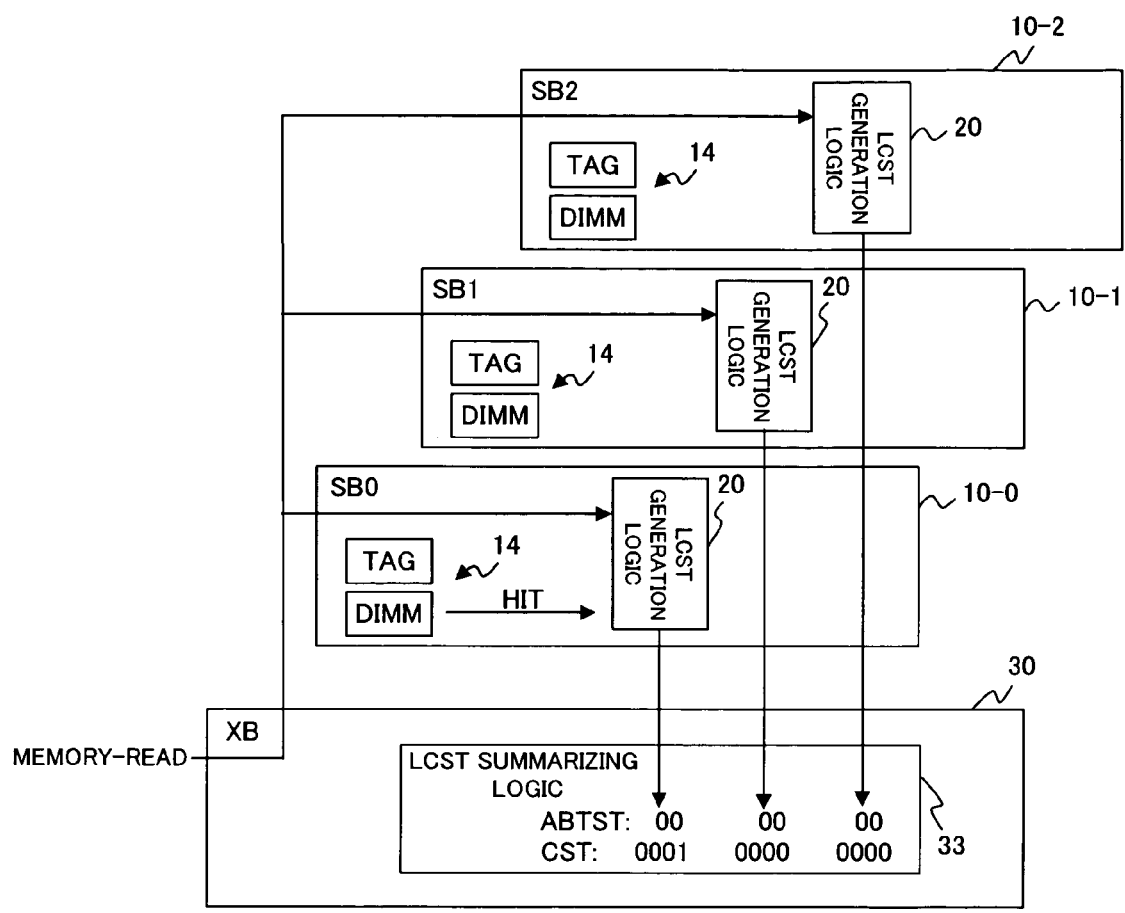
FIG. 5 is a diagram for explaining an example of determination of a final operation for a request by a determination section of a controller in the information processing system of the present embodiment.

The example shown in FIG. 5 is a case where the busy judgment section 22 of the LCST generation logic 20 of each of the pipeline processors 10-0 to 10-2 does not detect a busy state of the request queue 13 (ABTST; "00"), the retainment judgment section 21 of the pipeline processor 10-0 detects a DIMM hit to the data of the read request (CST; "0001"), and the retainment judgment section 21 of the pipeline processors 10-1 and 10-2 does not detect the data of the read request (CST; "0000").

At this time, as shown in FIG. 5, the LCST summarizing logic 33 summarizes the judgment result notified from each of the pipeline processors 10-0 to 10-2.

Then, the determination section 35 of the GCST generation logic 34 determines a final operation for the read request based on the judgment result summarized by the LCST summarizing logic 33.

Here, a busy state of the request queue 13 is not detected from any one of the pipeline processors 10-0 to 10-2 and only the pipeline processor 10-0 detects a DIMM hit, therefore, the determination section 35 determines to assign the read request to the pipeline processor 10-0. In other words, the determination result notification section 36 issues SLAVE_REQ (REQUEST) for causing the DIMM of the connected operation section A or B to execute read access to the request queue 13 of the pipeline processor 10-1.

When the determination result by the determination section 35 is notified to each of the pipeline processors 10-0 to 10-2 by the determination result notification section 36, in the pipeline processor 10-0, the GCST judgment logic 28 registers the read request retained in the pipeline register 12 into the request queue 13 as a valid entry and on the other hand, in the pipeline processors 10-1 and 10-2, the GCST judgment logic 28 invalidates the read request retained by the pipeline register 12.

Figure 6:
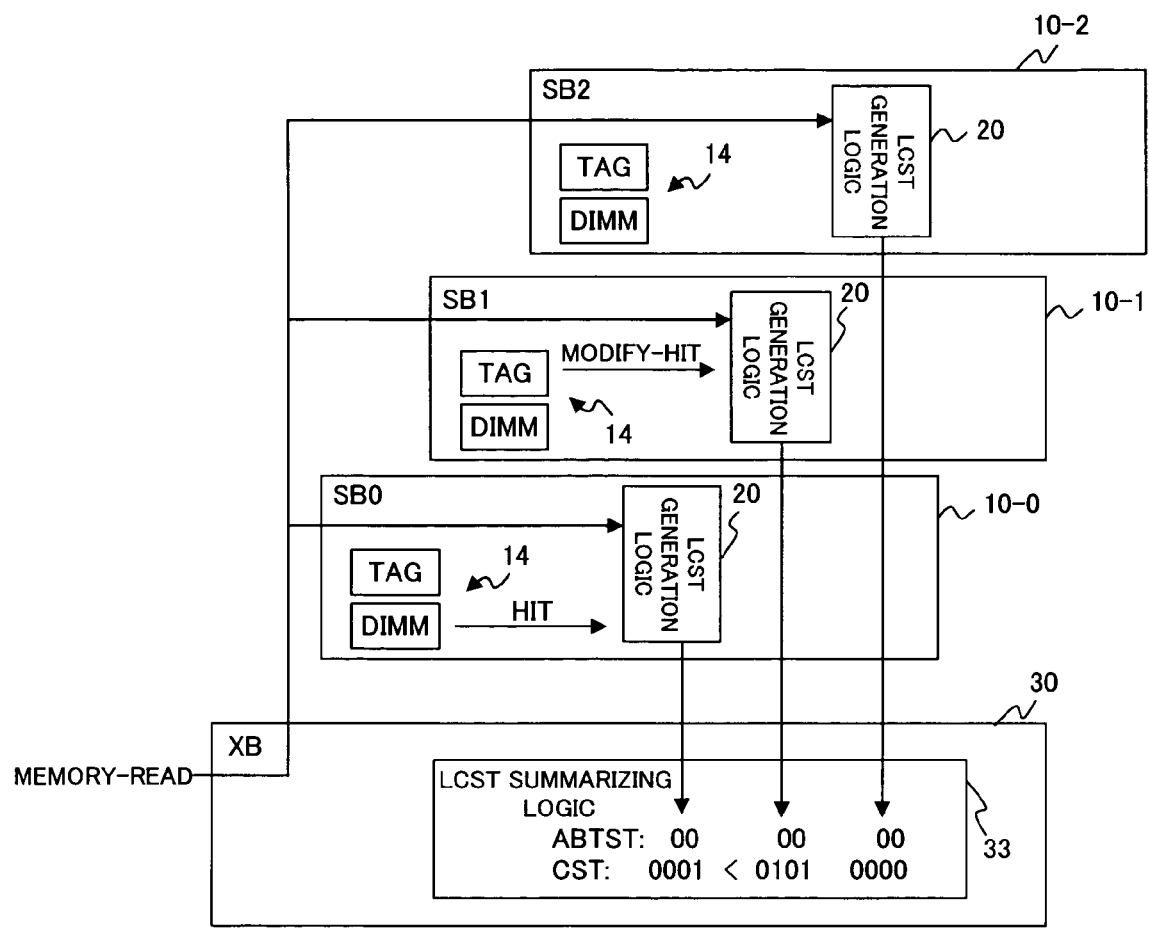
FIG. 6 is a diagram for explaining an example of determination of a final operation for a request by a determination section of a controller in the information processing system of the present embodiment.

Next, the example shown in FIG. 6 is explained. The example shown in FIG. 6 is a case where the busy judgment section 22 of the LCST generation logic 20 of each of the pipeline processors 10-0 to 10-2 does not detect a busy state of the request queue 13 (ABTST; "00"), the retainment judgment section 21 of the pipeline processor 10-0 detects a DIMM hit to the data of the read request (CST; "0001"), the retainment judgment section 21 of the pipeline processor 10-1 detects a Modify hit to the data of the read request (CST; "0101"), and the retainment judgment section 21 of the pipeline processor 10-2 does not detect the data of the read request (CST; "0000").

At this time, as shown in FIG. 6, the judgment result is summarized by the LCST summarizing logic 33 and a busy state of the request queue 13 is not detected from any one of the pipeline processors 10-0 to 10-2, therefore, the determination section 35 determines to assign the read request to the pipeline processor 10-1 that has detected the Modify hit (CST; "0101") the priority of which is higher than that of the DIMM hit (CST; "0001").

In other words, the determination section 35 does not cause the pipeline processor 10-0 to execute the read access to the DIMM of the connected operation section A or B but causes the pipeline processor 10-1 to execute the read access to the connected operation section A or B.

When the judgment result by the determination section is received, the read request retained in the pipeline register 12 is invalidated in the pipeline processors 10-0 and 10-2 and the read request is registered into the request queue 13 as a valid entry in the pipeline processor 10-1.

Figure 7:
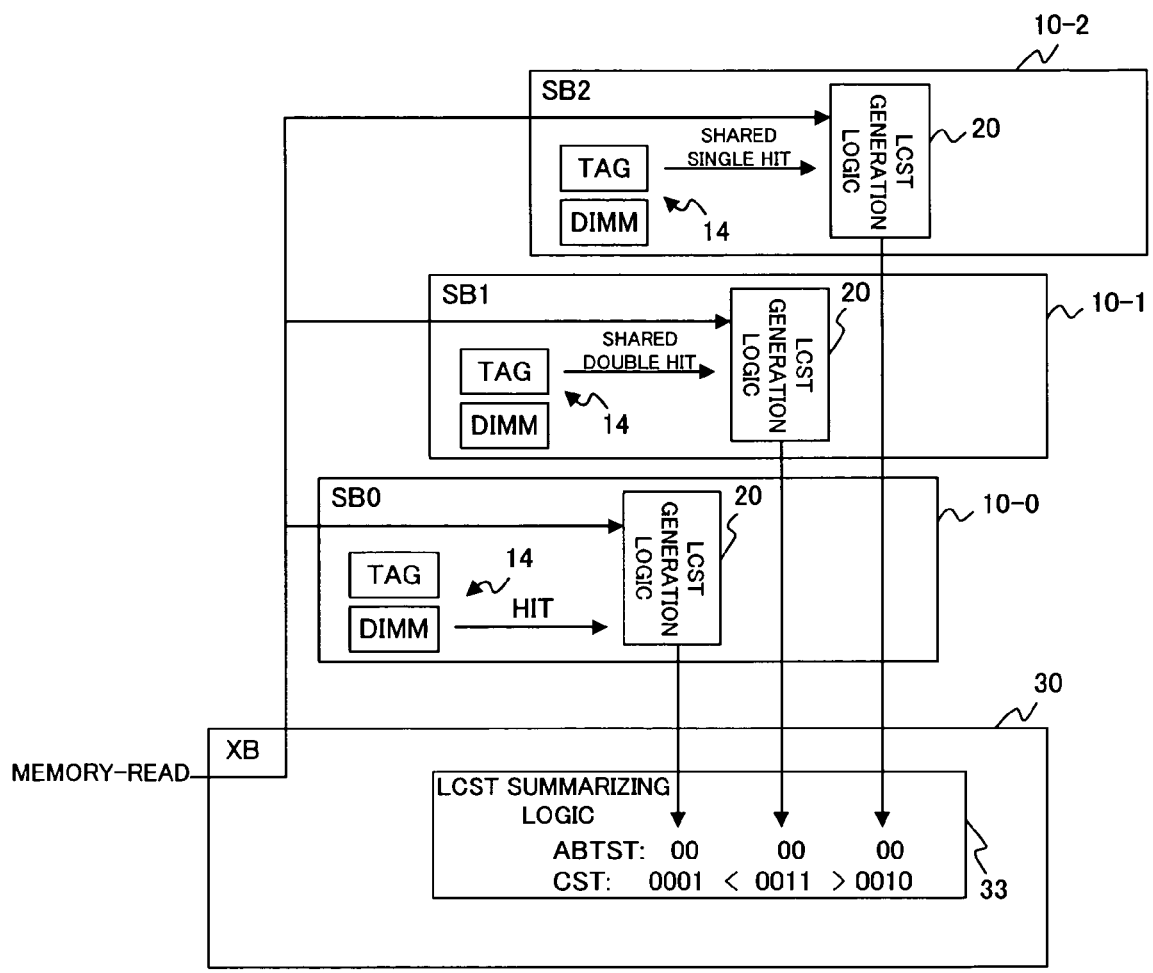
FIG. 7 is a diagram for explaining an example of decision of a final operation for a request by a determination section of a controller in the information processing system of the present embodiment.

Next, the example shown in FIG. 7 is explained below. The example shown in FIG. 7 is a case where the busy judgment section 22 of the LCST generation logic 20 of each of the pipeline processors 10-0 to 10-2 does not detect a busy state of the request queue 13 (ABTST; "00"), the retainment judgment section 21 of the pipeline processor 10-0 detects a DIMM hit to the data of the read request (CST; "0001"), the retainment judgment section 21 of the pipeline processor 10-1 detects a Shared-Double hit to the data of the read request (CST; "0011"), and the retainment judgment section 21 of the pipeline processor 10-2 detects a Shared-Single hit to the data of the read request (CST; "0010").

At this time, as shown in FIG. 7, the judgment result is summarized by the LCST summarizing logic 33 and since a busy state of the request queue 13 is not detected from any one of the pipeline processors 10-0 to 10-2, the determination section 35 determines to assign the read request to the pipeline processor 10-1 that has detected the Shared-Double hit with the highest priority (CST; "0011").

In this case also, the read request is invalidated in the pipeline processors 10-0 and 10-2 and the read request is registered into the request queue 13 as a valid entry in the pipeline processor 10-1.

Figure 8:
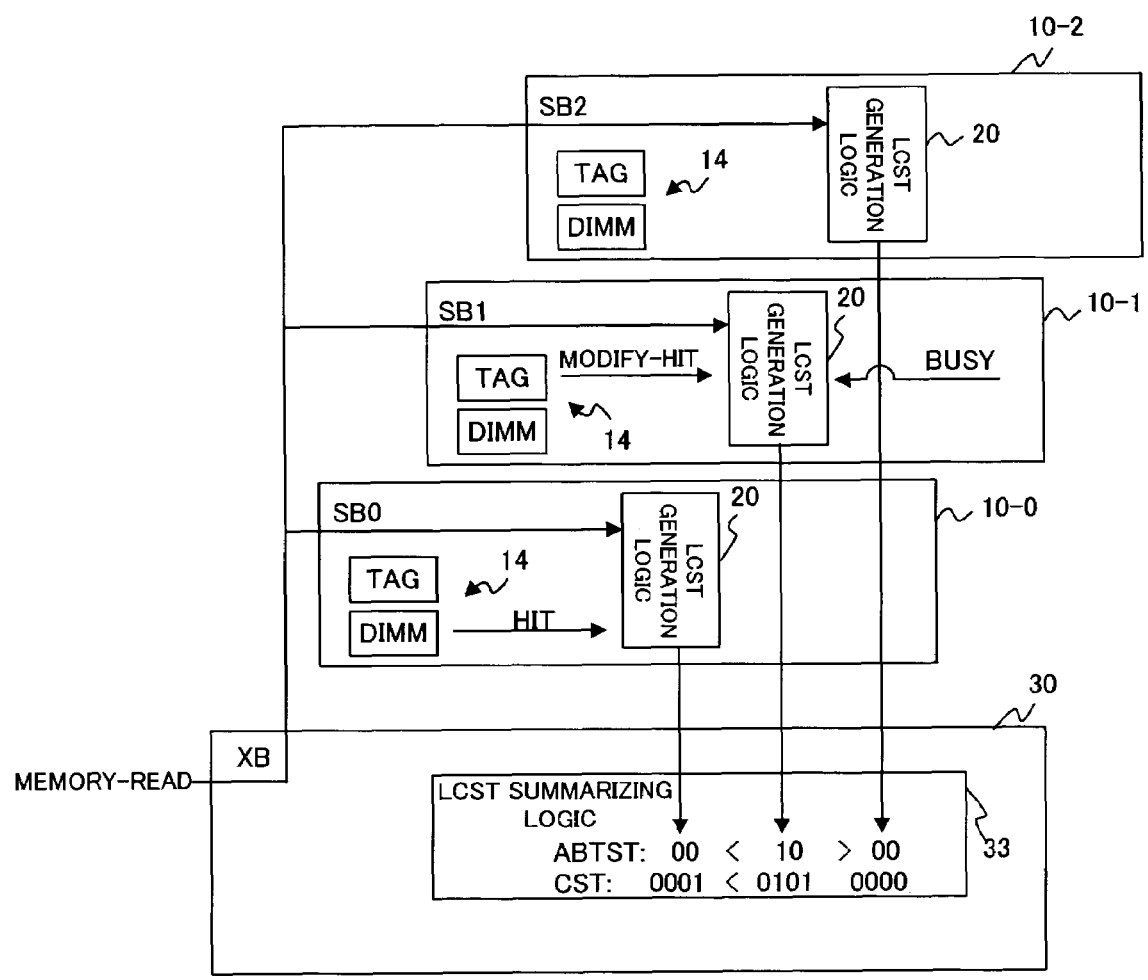
FIG. 8 is a diagram for explaining an example of determination of a final operation for a request by a determination section of a controller in the information processing system of the present embodiment.
Figure 9:
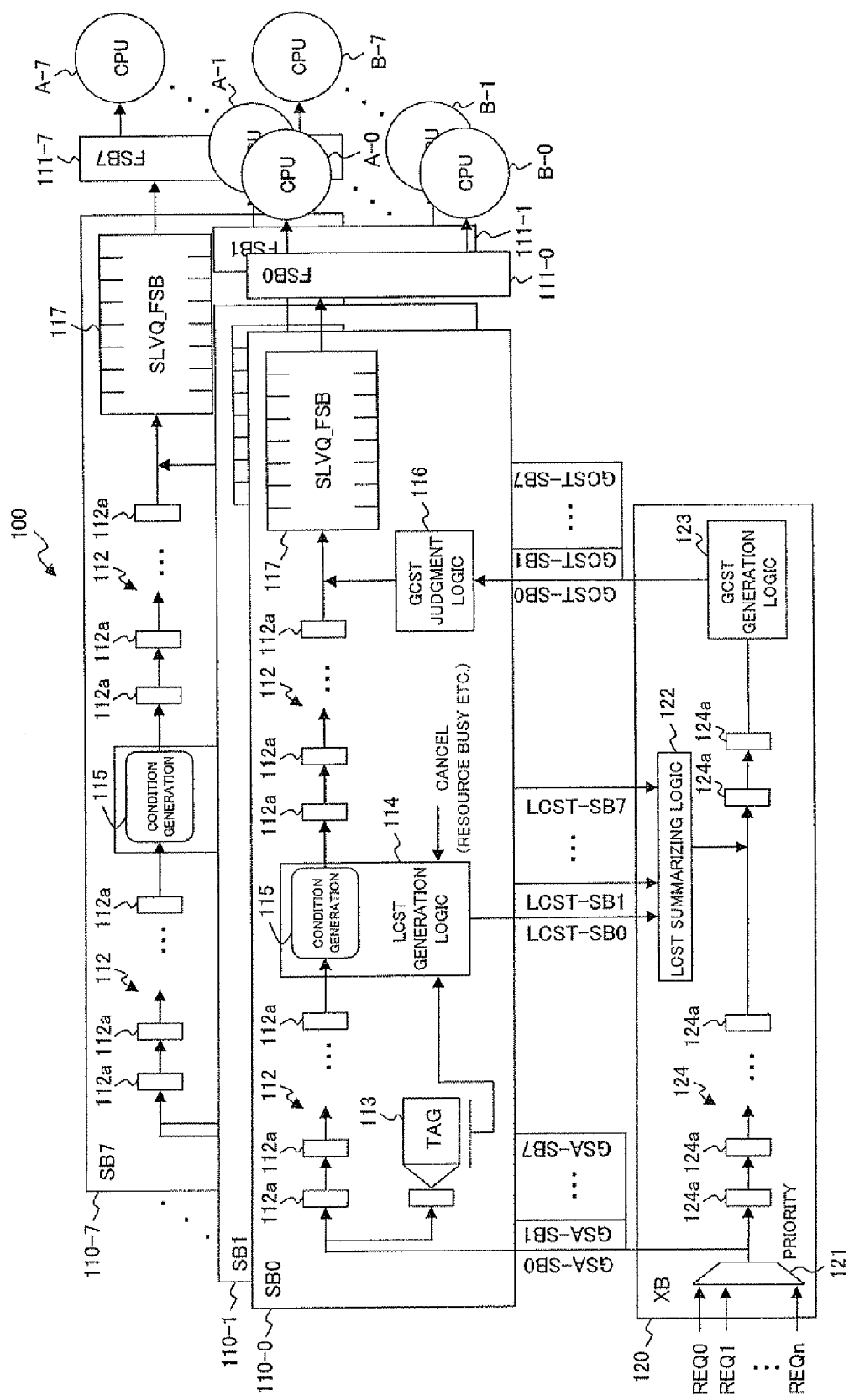
FIG. 9 is a block diagram showing a configuration of a conventional information processing system.
Figure 10:
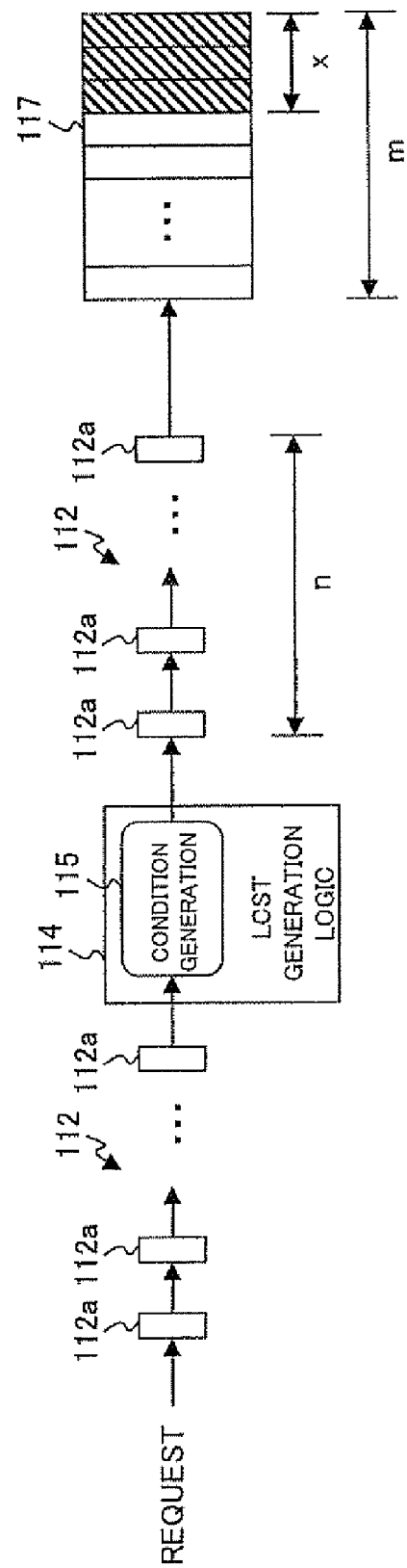
FIG. 10 is a diagram for explaining a busy state judgment method of a request queue by an LCST generation logic of a pipeline processor of a conventional information processing system.

Next, the example shown in FIG. 8 is explained below. The example shown in FIG. 8 is a case where the busy judgment section 22 of the LCST generation logic 20 of the pipeline processors 10-0 and 10-2 does not detect a busy state of the request queue 13 (ABTST; "00"), the busy judgment section 22 of the pipeline processor 10-1 detects a busy state of the request queue 13 (ABTST; "10"), the retainment judgment section 21 of the pipeline processor 10-0 detects a DIMM hit to the data of the read request (CST; "0001"), the retainment judgment section 21 of the pipeline processor 10-1 detects a Modify hit to the data of the read request (CST; "0101"), and the retainment judgment section 21 of the pipeline processor 10-2 does not detect the data of the read request (CST; "0000").

At this time, as shown in FIG. 8, the judgment result is summarized by the LCST summarizing logic 33 and since a Busy of the request queue 13 is detected in the pipeline processor 10-1 (ABTST; "10"), the determination section 35 does not assign the read request to any one of the pipeline processors 10-0 to 10-2 but reenters the request into the request notification section 31 in order to execute the read request again.

In this case, therefore, the invalidation of the read request is issued to each of the pipeline processors 10-0 to 10-2 and the read request is invalidated in each of the pipeline processors 10-0 to 10-2.

In this manner, the determination section 35 determines a final operation for the request based on the priority of the judgment result (refer to FIG. 2 and FIG. 3) summarized by the LCST summarizing logic 33. At this time, if the judgment result by the busy judgment section 22 of at least one of the pipeline processors 10 is a "Retry" or a "Bus", regardless of the judgment result from the retainment judgment section 21 of each of the pipeline processors 10, the determination section 35 does not assign the request to any one of the pipeline processors 10 but reenters the request into the request notification section 31 in order to retry the request.

As described above, according to the information processing system 1 in an embodiment of the present invention, since each pipeline processor 10 is provided with the pipeline busy counter 25 for counting the valid requests retained in the registers 12a between the LCST generation logic 20 and the request queue 13, it is possible for the busy judgment section 22 to make a busy judgment of the request queue 13 without fail in order for the condition generation section 23 to judge whether or not the request is a valid request in a stage in which the request is retained halfway in the pipeline register 12.

Further, since the pipeline busy counter 25 decrements the counter when the request passes through the final stage register 12a as well as incrementing the counter when the condition generation section 23 judges the request to be a valid request, it is not necessary to provide a circuit etc. for judging whether a valid request or an invalid request is retained in each of the registers 12a between the LCST generation logic 20 and the request queue 13 and thereby it is possible to make a busy judgment of the request queue 13 by counting the number of valid requests with fewer resources.

Furthermore, regardless of the number of registers 12a between the CST generation logic 20 and the request queue 13 and even if the number of registers 12a therebetween is enormous, it is possible to accurately count the valid requests retained in the registers 12a therebetween by using the pipeline busy counter 25, therefore, the busy management of the request queue 13 can be performed without fail.

Still furthermore, since the number of valid entries counting logic 26 and the adder 27 are provided in the configuration, it is possible for the busy judgment section 22 to make a busy judgment of the request queue 13 only by judging whether or not the sum of the number of valid requests of the pipeline busy counter 25 calculated by the adder 27 and the number of valid entries of the number of valid entries counting logic 26 is equal to the total number of entries of the request queue 13 and thereby the configuration of the busy judgment section 22 can be simplified.

[2] Others

The present invention is not limited to the embodiments described above and various modifications are possible without departing the concept and scope of the present invention.

For example, in the embodiments described above, the example is explained in which each pipeline processor 10 is connected to the controller 30, but the present invention is not limited to this and another configuration may be possible, in which an IOU (Input/Output Unit) is connected to the controller 30 and a request is notified in order to cause the IOU to execute the request, the judgment result (LCST) from the IOU is summarized in the GCST generation logic to determine a final operation for the request including the IOU and each pipeline processor in the GCST generation logic, and it is notified to the IOU and each pipeline processor 10. In this case, as shown in FIG. 1 described above, it is preferable that the register 32a for synchronizing the summary of the judgment result from each pipeline processor 10 with the summary of the judgment result from the IOU be provided.

Further, the functions of the retainment judgment section 21, the busy judgment section 22, the condition generation section 23, the judgment result notification section 24, the pipeline busy counter 25, the number of valid entries counting logic 26, the adder 27, and the GCST judgment logic 28 of each pipeline processor, and the request notification section 31, the LCST summarizing logic 33, the determination section 35, and the determination result notification section 36 of the controller 30 may be realized by the execution of a predetermined application program (a busy judgment program) by a computer (including a CPU, an information processor, and various terminals).

The program is provided in the form of being recorded in a computer readable recording medium, such as a flexible disk, CD (CD-ROM, CD-R, CD-RW, etc.), and DVD (DVD-ROM, DVD-RAM, DVD-R, DVD-RW, DVD+R, DVD+RW, etc.). In this case, a computer reads, for example, the busy judgment program from such a recording medium and transfers, stores and uses it in an internal storage device or an external storage device. It may also be possible to store the program in a storage device (a recording medium) such as a magnetic disk, an optical disk, and a magnetic optical disk, and provide a computer with the program from the recording device via a communication line.

Here, a computer is a concept including hardware and an OS (an operating system), meaning hardware that operates under the control of the OS. In a case where an OS is not necessary and an application program alone operates hardware, the hardware itself corresponds to a computer. Hardware comprises at least a microprocessor such as a CPU and a means for reading a computer program stored in a recording medium.

The application program as the busy judgment program described above contains a program code to realize the functions as the retainment judgment section 21, the busy judgment section 22, the condition generation section 23, the judgment result notification section 24, the pipeline busy counter 25, the number of valid entries counting logic 26, the adder 27, the GCST judgment logic 28, the request notification section 31, the LCST summarizing logic 33, the determination section 35, and the determination result notification section 36 in the above-mentioned computer. Further part of the functions may be realized by mean of an OS not by the application program.

Furthermore, as the recording medium in the present embodiment, in addition to the above-mentioned flexible disk, CD, DVD, magnetic disk, optical disk, and magnetic optical disk, various computer readable media such as an IC card, ROM cartridge, magnetic tape, punch card, computer internal storage device (memory such as RAM and ROM), external storage device, and a printing including a printed code such as a barcode, etc., may be utilized.

What is claimed is:

1. An information processing system, comprising:
a plurality of pipeline processors, connected to an operation section for executing a request, executing a pipeline process in synchronization with each other; and
a controller notifying said plurality of pipeline processors of a request at the same time, and determining a final operation for the request, wherein:
each of said plurality of pipeline processors comprises:
a pipeline register, including a number of multi-stage registers capable of retaining a request notified by said controller, retaining the request while sequentially moving the request from an upstream side to a downstream side;
a request queue, provided at a subsequent stage of said pipeline register, storing the request;
a data information retainment section retaining data information concerning data retained in a storage section of said operation section connected to itself;
a retainment judgment section judging whether or not said operation section connected to itself retains the data to be used by the request retained in said pipeline register;
a judgment section judging whether or not the request retained in said pipeline register is a valid request capable of being stored by said request queue;
a first counter counting the number of valid requests in said pipeline register between said judgment section and said request queue;
a second counter counting the number of valid entries of said request queue;

a calculation section calculating the sum of the number of said valid requests counted by said first counter and the number of said valid entries counted by said second counter;

a busy judgment section judging whether or not said request queue is in a busy state based on said sum calculated by said calculation section; and a judgment result notification section notifying said controller of the result of the busy state judgment by said busy judgment section and the result of the retainment judgment by said retainment judgment section, wherein said judgment section, if the result of the retainment judgment by said retainment judgment section is negative or if the result of the busy state judgment by said busy judgment section is positive, invalidates said request;

said first counter, if said judgment section judges that the request is a valid request, increments the number of valid requests by one and, if a valid request passes through a final stage register of said pipeline register, decrements the number of valid requests by one; and said second counter, if a valid request is newly put into said request queue as a valid entry, increments the number of valid entries by one and on the other hand, if a request process relating to a valid entry retained in said request queue is completed, decrements the number of valid entries by one; and said controller comprises:

a request notification section simultaneously notifying said plurality of pipeline processors of a request;

a determination section determining a final operation for the request based on said result of the busy state judgment and said result of the retainment judgment notified from said judgment result notification section of said plurality of pipeline processors; and a determination result notification section simultaneously notifying said plurality of pipeline processors of the determination result by said determination section;

wherein each of said plurality of pipeline processors comprises a decision section invalidating said request before said request is retained in said request queue if said determination result notified from said determination result notification section of said controller is that the request is not to be dealt with by itself.

2. The information processing system according to claim 1, wherein, if said request queue is judged to be in a busy state by said busy judgment section, said judgment section does not judge that the request is said valid request.

3. The information processing system according to claim 1, wherein said determination section of said controller determines a final operation for the request based on the result of the retainment judgment by said retainment judgment section notified from said judgment result notification section of said plurality of pipeline processors.

4. The information processing system according to claim 1 wherein:

said retainment judgment section makes judging whether or not data used by the request is most recent data based on data information; and said judgment result notification section, if said retainment judgment section judges that the data used by the request is the most recent data, notifies said controller of information about the retainment of the most recent data used by said request as the result of the retainment judgment by said retainment judgment section.

5. The information processing system according to claim 3, wherein:

said retainment judgment section makes judging whether or not data used by the request is most recent data based on data information; and said judgment result notification section, if said retainment judgment section judges that the data used by the request is the most recent data, notifies said controller of information about the retainment of the most recent data used by said request as the result of the retainment judgment by said retainment judgment section.

6. A pipeline processor, connected to an operation section executing a request and to a controller determining a final operation for a request as well as notifying the request, executing a pipeline process in synchronization with other pipeline processors, said pipeline processor comprising:

a pipeline register, including a number of multi-stage registers capable of retaining a request notified by said controller, retaining the request while sequentially moving the request from an upstream side to a downstream side;

a request queue, provided at a subsequent stage of said pipeline register, storing the request;

a data information retainment section retaining data information concerning data retained in a storage section of said operation section connected to itself;

a retainment judgment section judging whether or not said operation section connected to itself retains the data to be used by the request retained in said pipeline register;

a judgment section judging whether or not the request retained in said pipeline register is a valid request capable of being stored by said request queue;

a first counter counting the number of valid requests in said pipeline register between said judgment section and said request queue;

a second counter counting the number of valid entries of said request queue;

a calculation section calculating the sum of the number of said valid requests counted by said first counter and the number of said valid entries counted by said second counter;

a busy judgment section judging whether or not said request queue is in a busy state based on said sum calculated by said calculation section; and a judgment result notification section notifying said controller of the result of the busy state judgment by said busy judgment section and the result of the retainment judgment by said retainment judgment section, wherein said judgment section, if the result of the retainment judgment by said retainment judgment section is negative or if the result of the busy state judgment by said busy judgment section is positive, invalidates said request;

said first counter, if said judgment section judges that the request is a valid request, increments the number of valid requests by one and, if a valid request passes through a final stage register of said pipeline register, decrements the number of valid requests by one; and said second counter, if a valid request is newly put into said request queue as a valid entry, increments the number of valid entries by one and on the other hand, if a request process relating to a valid entry retained in said request queue is completed, decrements the number of valid entries by one.

7. The pipeline processor according to claim 6, wherein, if said request queue is judged to be in a busy state by said busy judgment section, said judgment section does not judge that the request is said valid request.

8. The pipeline processor according to claim 6, further comprising a decision section putting said request into said request queue as said valid entry if the final determination result for the request notified from said controller is that the request is to be dealt with by itself and on the other hand, invalidating said request if the request is not to be dealt with by itself.

9. The pipeline processor according to claim 6, wherein:
said retainment judgment section makes judging whether or not data used by the request is most recent data based on data information; and
said judgment result notification section, if said retainment judgment section judges that the data used by the request is the most recent data, notifies said controller of information about the retainment of the most recent data used by said request as the result of the retainment judgment by said retainment judgment section.

10. A computer readable recording medium in which a busy judgment program is recorded, the busy judgment program for use with an information processing system comprising a plurality of pipeline processors, connected to an operation section for executing a request, executing a pipeline process in synchronization with each other, and a controller notifying said plurality of pipeline processors of a request at the same time, and determining a final operation for the request, wherein each of said plurality of pipeline processors comprises a pipeline register, including a number of multi-stage registers capable of retaining a request notified by said controller, retaining the request while sequentially moving the request from an upstream side to a downstream side, and a request queue, provided at a subsequent stage of said pipeline register, storing the request, wherein said busy judgment program instructs a computer to function as:
a data information retainment section retaining data information concerning data retained in a storage section of said operation section connected to itself;
a retainment judgment section judging whether or not said operation section connected to itself retains the data to be used by the request retained in said pipeline register;
a judgment section judging whether or net the request retained in said pipeline register is a valid request capable of being stored by said request queue in a stage in which said request is retained halfway in said pipeline register;
a first counter counting the number of valid requests in said pipeline register between said judgment section and said request queue;
a second counter counting the number of valid entries of said request queue;
a calculation section calculating the sum of the number of said valid requests counted by said first counter and the number of said valid entries counted by said second counter;
a busy judgment section judging whether or not said request queue is in a busy state based on said sum calculated by said calculation section; and
a judgment result notification section notifying said controller of the result of the busy state judgment by said busy judgment section and the result of the retainment judgment by said retainment judgment section, wherein said busy judgment program makes said computer function so that said judgment section, if the result of the retainment judgment by said retainment judgment section is negative or if the result of the busy state judgment by said busy judgment section is positive, invalidates said request;
said first counter, if said judgment section judges that the request is a valid request, increments the number of valid requests by one and, if a valid request passes through a final stage register of said pipeline register, decrements the number of valid requests by one; and
said second counter, if a valid request is newly put into said request queue as a valid entry, increments the number of valid entries by one and on the other hand, if a request process relating to a valid entry retained in said request queue is completed, decrements the number of valid entries by one.

11. The computer readable recording medium according to claim 10, said busy judgment program instructing the computer to cause said busy judgment section to compare said sum calculated by said calculation section with the total number of entries of said request queue and judge that said request queue is in a busy state if said sum is equal to the total number of said entries.

12. A pipeline processor, connected to an operation section executing a request and to a controller determining a final operation for a request as well as notifying the request, executing a pipeline process in synchronization with other pipeline processors, said pipeline processor comprising:
a pipeline register, including a number of multi-stage registers capable of retaining a request notified by said controller, retaining the request while sequentially moving the request from an upstream side to a downstream side;
a request queue, provided at a subsequent stage of said pipeline register, storing the request;
a data information retainment means for retaining data information concerning data retained in a storage section of said operation section connected to itself;
a retainment judgment means for judging whether or not said operation section connected to itself retains the data to be used by the request retained in said pipeline register
first judgment means for judging whether or not the request retained in said pipeline register is a valid request capable of being retained by said request queue;
first counting means for counting the number of valid requests in said pipeline register between said first judgment means and said request queue;
second counting means for counting the number of valid entries of said request queue;
calculation means for calculating the sum of the number of said valid requests counted by said first counting means and the number of said valid entries counted by said second counting means;
second judgment means for judging whether or not said request queue is in a busy state based on the calculated sum; and
means for notifying said controller of the result of the busy state judgment by said second judgment means and the result of the retainment judgment by said retainment judgment means, wherein
said first judgment means, if the result of the retainment judgment by said retainment judgment means is negative or if the result of the busy state judgment by said second judgment means is positive, invalidates said request,
if said first judgment means judges that the request is a valid request, said first counting means for counting increments the number of valid requests by one and, if said valid request passes through a final stage register of said pipeline register, said first counting means for counting decrements the number of valid requests by one, and said second counting means, if a valid request is newly put into said request queue as a valid entry, increments the number of valid entries by one and on the other hand, if a request process relating to a valid entry retained in said request queue is completed, decrements the number of valid entries by one.

* * * * *

UNITED STATES PATENT AND TRADEMARK OFFICE
CERTIFICATE OF CORRECTION

PATENT NO. : 7,490,219 B2 Page 1 of 1
APPLICATION NO. : 11/157809
DATED : February 10, 2009
INVENTOR(S) : Takao Matsui et al.

It is certified that error appears in the above-identified patent and that said Letters Patent is hereby corrected as shown below:

Column 21, Line 44, change "net" to --not--.

Signed and Sealed this

Twenty-first Day of April, 2009

JOHN DOLL
*Acting Director of the United States Patent and Trademark Office*